No. 872,260. PATENTED NOV. 26, 1907.
C. S. SHANK.
CORN THINNER.
APPLICATION FILED OCT. 12, 1906.
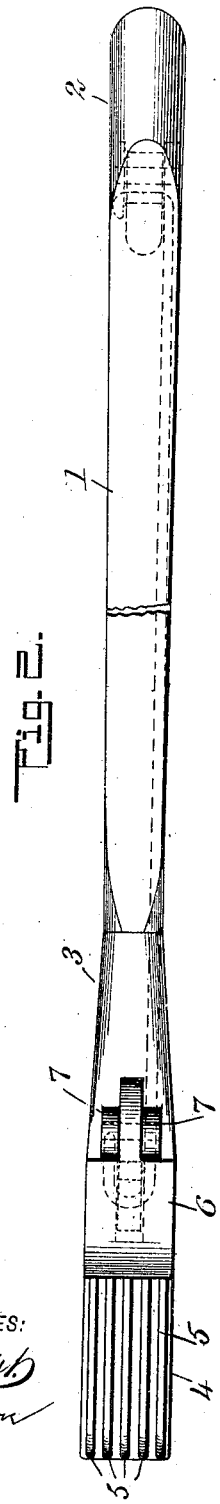
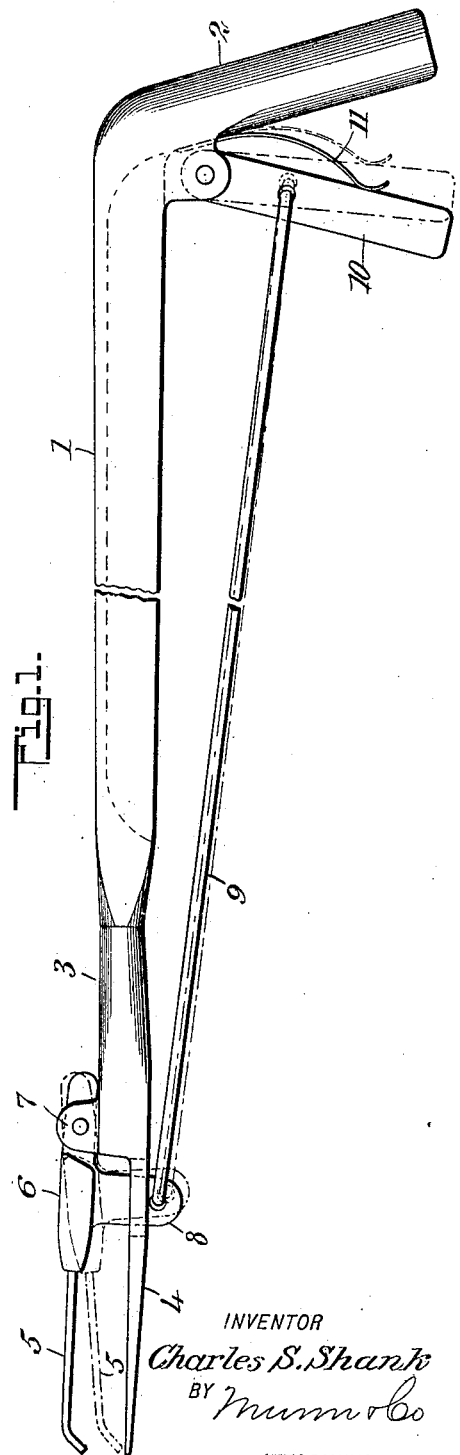
WITNESSES:
INVENTOR
Charles S. Shank
BY
ATTORNEYS
THE NORRIS PETERS CO., WASHINGTON, D. C.

UNITED STATES PATENT OFFICE.

CHARLES SPURGEON SHANK, OF SCOTT DEPOT, WEST VIRGINIA, ASSIGNOR OF ONE-THIRD TO ROBERT A. STEWART, OF SCOTT DEPOT, WEST VIRGINIA.

CORN-THINNER.

No. 872,260.     Specification of Letters Patent.     Patented Nov. 26, 1907.

Application filed October 12, 1906. Serial No. 338,597.

*To all whom it may concern:*

Be it known that I, CHARLES SPURGEON SHANK, a citizen of the United States, and a resident of Scott Depot, in the county of Putnam and State of West Virginia, have invented a new and Improved Corn-Thinner, of which the following is a full, clear, and exact description.

This invention relates to improvements in devices particularly adapted for thinning out corn plants, the object being to provide a device for this purpose, that will be simple in construction, and by means of which the plants will be easily drawn out of the ground.

I will describe a corn thinner embodying my invention and then point out the novel features in the appended claims.

Reference is to be had to the accompanying drawings forming a part of this specification, in which similar characters of reference indicate corresponding parts in all the figures.

Figure 1 is a front view of a corn thinner embodying my invention; and Fig. 2 is a side view thereof.

The device comprises a staff 1 of any suitable length, provided at its upper end with a laterally disposed handle, 2, and on the lower end of the staff is a ferrule 3 from which a blade 4 extends downward. Co-acting with the blade 4 is a jaw consisting of fingers 5 spaced apart and extended from a block 6 pivoted to lugs 7 on the ferrule 3, and from this block 6 an arm 8 extends through an opening in the blade 4, and connects with a rod 9 which passes upward to connection with a hand-lever 10 having swinging connection with the handle 2 and normally pressed downward by means of a plate-spring 11 attached at one end to said handle 2 and bearing at its free end upon the lever 10.

It will be noted in Fig. 1 that the ends of the spaced fingers 5 are curved inward.

In operation the blades 4 and the fingers 5 are to be forced into the ground at opposite sides of the plant to the depth of the roots thereof, then by drawing the lever 10 toward the handle 2, the fingers will be moved towards the blade until their bent ends engage the said blade, when by an upward movement of the instrument the plant with its roots will be drawn out of the ground.

Having thus described my invention I claim as new, and desire to secure by Letters Patent;

1. A corn thinner, consisting of a staff having a handle at its upper end, a slotted blade having a ferrule fitting on the lower end of the staff and provided with lugs, a jaw comprising a block pivoted to the lugs of the ferrule, and fingers projecting from the block and having inwardly curved lower ends, the block being provided with an arm, rigid therewith and extending through the slot of the blade, a pivoted hand lever adjacent to the handle of the staff, a spring between the hand lever and staff handle, and a rod connecting the hand lever and arm of the said block.

2. A corn thinner, comprising a staff having a handle at its upper end, a blade on the lower end of the handle and provided with a slot, a jaw comprising a block pivoted to the staff and fingers projecting from the block and having inwardly bent lower ends, the block being provided with an arm rigid therewith and projecting through the slot of the blade, a pivoted and spring pressed hand lever on the staff adjacent to the handle thereof, and a rod connecting the hand lever and arm of the block.

In testimony whereof I have signed my name to this specification in the presence of two subscribing witnesses.

CHARLES SPURGEON SHANK.

Witnesses:
    W. N. HERNDON,
    J. S. FRAVEL.